US009779067B2

(12) United States Patent
Pettitt et al.

(10) Patent No.: US 9,779,067 B2
(45) Date of Patent: Oct. 3, 2017

(54) SYSTEMS AND METHODS FOR ONLINE PUBLISHING AND CONTENT SYNDICATION

(71) Applicant: Yieldmo, Inc., New York, NY (US)

(72) Inventors: John Philip Pettitt, Sausalito, CA (US); Katerine Elizabeth McKinley, San Francisco, CA (US); Timothy Sean McElreavy, San Francisco, CA (US)

(73) Assignee: Yieldmo, Inc., New York, NY (US)

( * ) Notice: Subject to any disclaimer, the term of this patent is extended or adjusted under 35 U.S.C. 154(b) by 768 days.

(21) Appl. No.: 14/012,066

(22) Filed: Aug. 28, 2013

(65) Prior Publication Data

US 2014/0006931 A1     Jan. 2, 2014

Related U.S. Application Data

(63) Continuation of application No. PCT/US2012/027030, filed on Feb. 28, 2012.
(Continued)

(51) Int. Cl.
G06F 17/00 (2006.01)
G06F 17/22 (2006.01)
(Continued)

(52) U.S. Cl.
CPC ...... G06F 17/2247 (2013.01); G06F 17/3089 (2013.01); G06Q 30/02 (2013.01); H04L 67/26 (2013.01)

(58) Field of Classification Search
CPC ............ G06Q 30/0201; G06Q 30/0241; G06F 17/30702; G06F 17/30035
See application file for complete search history.

(56) References Cited

U.S. PATENT DOCUMENTS 7,028,089 B2   4/2006  Agarwalla et al.
8,473,838 B2 * 6/2013  Hickman ................. 715/221
(Continued)

OTHER PUBLICATIONS

PCT International Search Report of PCT/US12/27030; dated May 31, 2012.
(Continued)

Primary Examiner — Ariel Mercado Vargas
(74) Attorney, Agent, or Firm — Run8 Patent Group, LLC; Peter Miller (57) ABSTRACT

A system and method of republishing and syndicating digital content for use by consumer readers, comprising allowing a publisher to register with a syndication engine, to indicate content that the publisher wishes to make available for syndication, and to indicate at least one monetization model for the content. Upon registering with the syndication engine, transmitting a republish control for the publisher to embed in the content. Upon a republisher requesting to view content from the publisher, causing the publisher to transmit the content, including the republish control, to the republisher. If the republisher desires to republish the content, allowing the republisher to select the republish control. Causing transmission of a republish request to the syndication engine in response to selection of the republish control. Then transmitting a unique embed code to the republisher for embedding into a republisher webpage to facilitate republishing of the content from the publisher.

15 Claims, 6 Drawing Sheets

Related U.S. Application Data (60) Provisional application No. 61/447,567, filed on Feb. 28, 2011.

(51) Int. Cl.
   *H04L 29/08* (2006.01)
   *G06Q 30/02* (2012.01)
   *G06F 17/30* (2006.01)

(56) References Cited

U.S. PATENT DOCUMENTS

| | | | |
|---|---|---|---|
| 9,104,773 B2* | 8/2015 | Gandhi | G06F 17/3089 |
| 2007/0038931 A1 | 2/2007 | Allaire et al. | |
| 2007/0180523 A1 | 8/2007 | Jablonski et al. | |
| 2008/0086689 A1* | 4/2008 | Berkley | G06F 17/30896 |
| | | | 715/201 |
| 2009/0240569 A1* | 9/2009 | Ramer | G06F 17/30749 |
| | | | 715/864 |
| 2009/0265621 A1* | 10/2009 | Hickman | G06Q 30/02 |
| | | | 715/273 |
| 2009/0265622 A1 | 10/2009 | Hickman | |
| 2009/0327869 A1* | 12/2009 | Fan | G06Q 30/02 |
| | | | 715/240 |
| 2010/0153486 A1 | 6/2010 | Stich et al. | |
| 2011/0112903 A1* | 5/2011 | Goldman | G06F 17/30716 |
| | | | 705/14.53 |
| 2011/0238495 A1* | 9/2011 | Kang | G06Q 30/02 |
| | | | 705/14.49 |
| 2012/0016749 A1* | 1/2012 | Lisbakken | G06Q 30/0275 |
| | | | 705/14.71 |

OTHER PUBLICATIONS

PCT Written Opinion of the International Searching Authority of PCT/US12/02730; dated May 31, 2012.

PCT International Preliminary Report on Patentability of PCT/US12/27030; dated Sep. 3, 2013.

* cited by examiner

—Syndicate From this Host—

☑ Syndicate this host —— 301

302

Select a Model
----------------
Repost.us supplied ads
☑ Free Syndication
Bring Your Own Ads Monetization Mode
Default Monetizati
Model Click here to
This will not t

Free Range Content

This is our special test laboratory blog.

Friday, February 25, 2011

This is an Article
Lorem ipsum dolor sit amet, consectetur adipiscing elit, sed do eiusmod tempor incididunt ut labore et dolore magna aliqua. Ut enim ad minim veniam, quis nostrud exercitation ullamco laboris nisi ut aliquip ex ea commodo consequat. Duis aute irure dolor in reprehenderit in voluptate velit esse cillum dolore eu fugiat nulla pariatur. Excepteur sint occaecat cupidatat non proident, sunt in culpa qui officia deserunt mollit anim id est laborum.

✂ Clip This Story
403 repost.us →
republish this article
402

Home    Older Post

Blog Archive 2011 (13)
  February (1)
    This is an Article

January (12)

SYSTEMS AND METHODS FOR ONLINE PUBLISHING AND CONTENT SYNDICATION

REFERENCE TO RELATED CASES

This patent application claims priority from and is related to International application no. PCT/US12/27030 filed Feb. 28, 2012, which claims priority from U.S. provisional application No. 61/447,567 filed Feb. 28, 2011, which are hereby incorporated by reference in their entirety.

FIELD OF THE INVENTION

The technology described in this patent document relates to online publishing and distributing and re-syndicating content.

BACKGROUND OF THE INVENTION

With the number of internet users increasing, it would seem that publishers and producers of online content should be experiencing steady growth in audience. Syndication has long been an effective strategy for media companies to reach an extended audience. However, despite the growth in audience and commensurate increase in potential consumption of online content, many media companies have seen their revenues decline over the past decade. Two currently available systems for online syndication, private syndication deals and Really Simple Syndication ("RSS") feeds, have proven to be ineffective revenue streams. Private syndication deals, such as those with the ASSOCIATED PRESS™ ("AP") and REUTERS™, must be negotiated and engineered on a case-by-case basis. The overhead inherent in the negotiating and engineering processes required severely limit these syndication opportunities. RSS, on the other hand, lacks any mechanism for control or monetization of content. Regular pirating of RSS feeds leaves content owners with no control over content integrity, branding, or monetization. Improved systems for online syndication are desired.

DETAILED DESCRIPTION OF CERTAIN EMBODIMENTS

Figure 1:
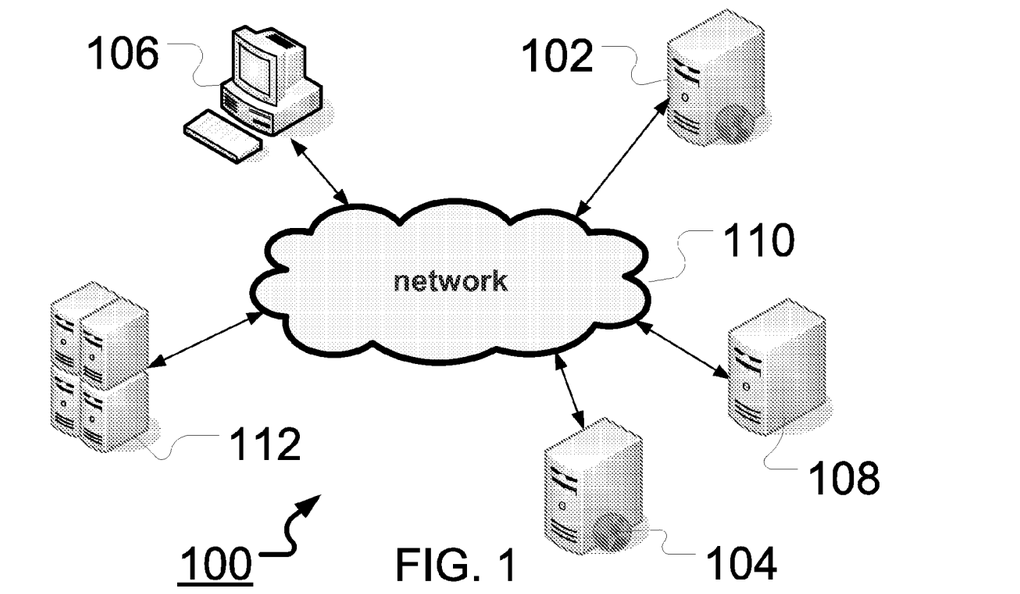
FIG. 1 is an overview of a system for use in distributing, publishing and re-syndicating content.

FIG. 1 is an overview of a system 100 for use in distributing, publishing, and re-syndicating content. The system 100 is shown to include an original content publisher 102, a content republisher 104, a reader (or consumer) 106 of the content, and a syndication engine 108. While content produced by original content publisher 102 can be viewed on a webpage hosted by publisher 102, a republisher 104 may wish to republish the content from publisher 102 rather than merely describing or linking to it. For example, a republisher 104 may wish to republish a news article from publisher 102 within a blog post. System 100 provides a platform for such republication that ensures content integrity and provides monetization models for publisher 102 to profit from the republishing.

A webpage hosted by publisher 102 may include a control to allow a republisher 104 to easily syndicate and republish content. Republisher 104 may simply select the control on the content page hosted by publisher 102 and, in return, receive code that republisher 104 may embed in their webpage to insert the content. Thus, when a reader 106 views the webpage hosted by republisher 104, the webpage assembled in a browser will include content from publisher 102 inserted directly into the page. System 100 allows republisher 104 to easily and legally republish content and provides publisher 102 with increased exposure, and a commensurately increased revenue stream, for the content.

Figure 2:
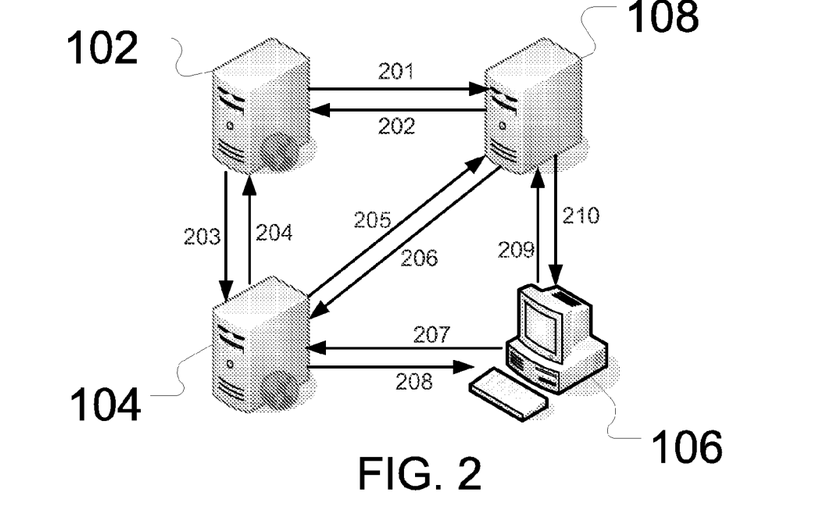
FIG. 2 shows a functional illustration of an exemplary data flow through the system of FIG. 1.
Figure 3:
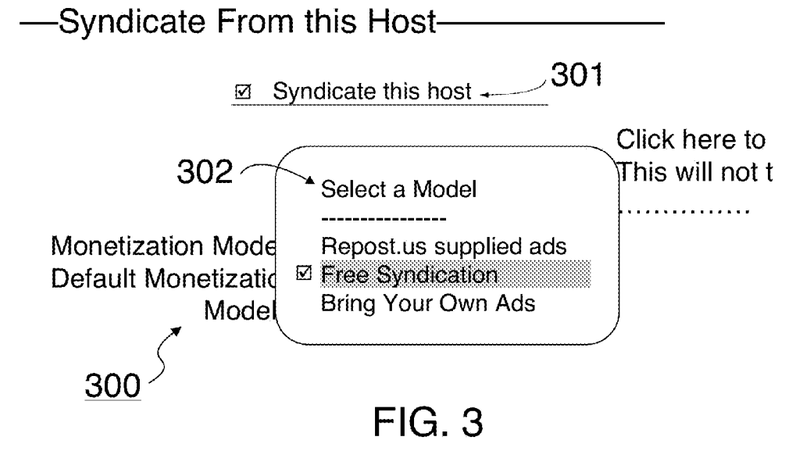
FIG. 3 shows a screenshot of an exemplary webpage having a selection control and a model control.
Figure 4:
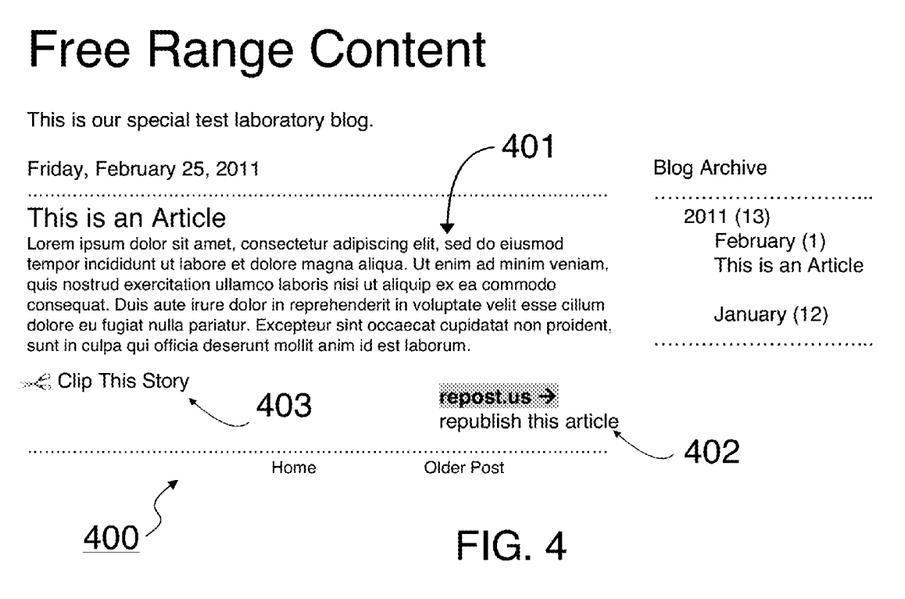
FIG. 4 shows a screenshot of an exemplary content page having content and a republish control embedded therein.

FIG. 2 shows a functional illustration of an exemplary data flow through system 100 of FIG. 1. In step 201, publisher 102 may register with syndication engine 108. For example, publisher 102 may indicate content the publisher 102 wishes to make available for syndicated distribution, one or more monetization model the publisher 102 wishes to implement, formatting of the content for distribution, caching options, and the like. Syndication engine 108 may, for example, host a webpage configured to allow a publisher to select various distribution options, such as those discussed in greater detail below. FIG. 3 shows a screenshot of an exemplary webpage 300 having a selection control 301 for allowing a publisher to select that they would like to offer a page for syndication and a model control 302 for allowing a publisher to select a monetization model for distribution. Of course, while selection control 301 is shown as a check box and model control 302 is shown as a drop down menu, any webpage user interface controls may be used. Once publisher 102 registers with syndication engine 108, in step 202 syndication engine 108 may transmit a republish control for publisher 102 to embed in the content page. FIG. 4 shows a screenshot of an exemplary content page 400 having content 401 and a republish control 402 embedded therein.

In step 203, republisher 104 may request to view a content page from publisher 102. In response to the request, in step 204 publisher 102 may transmit the content page, including a republish control, to republisher 104. If the republisher 104 desires to republish the content on the content page, republisher 104 may select the republish control. In step 205, republisher 104 may transmit a republish request to syndication engine 108 in response to selecting the republish control. In step 206, syndication engine 108 may transmit a unique embed code back to republisher 104 that republisher 104 may embed into a webpage to redistribute the content from publisher 102. Depending on the monetization model chosen by publisher 102, republisher 104 may be required to select a payment option or other licensing options prior to receiving the unique embed code from syndication engine in step 206.

In step 207, a reader 106 may request a webpage configured to display the republished content from republisher 104. At step 208, republisher 104 may transmit to reader 106 a webpage that includes the unique embed code. As a browser on reader 106 loads the webpage from republisher 104, it may execute the unique embed code embedded in the page and, in step 209, transmit a request to syndication engine 108 for content to insert into the page. In step 210, syndication engine 108 may transmit a content object to reader 106 for insertion into the page. The content object may be configured to automatically reformat itself according to the webpage it is inserted in, as described in more detail below. System 100, thus, allows for republisher 104 to easily republish content from publisher 102.

Referring again to FIG. 1, system 100 may also include one or more other entities 112. For example, creative providers may provide creatives, such as ads, for insertion into republished content for ad based monetization models. System 100 may also include one or more analytics entities configured to track various data related to system 100. Each of the components of FIG. 1 and their individual subcomponents are described in greater detail below.

As shown in the screenshot of FIG. 4, a publisher's webpage 400 may include a republish control 402. The republish control may be any user interface control configured to allow a user or entity to indicate their desire to republish or syndicate content on the webpage. A republish control, for example, may be a conventional button and the webpage may include code instructing the browser displaying the webpage to execute a function, such as a JAVASCRIPT function, when the republish button is selected. The function may then transmit a republish request to a syndication engine. The republish request may identify the identity of the republisher as well as the content to be republished.

Once receiving a republication request, the syndication engine may create embed code that uniquely identifies the republisher and the content for republishing. Because the embed code will be executed by a browser on an end user's computing device (e.g., reader 106 shown in FIG. 1), the identity of the republisher allows the syndication engine to ensure that the republication is approved by the agreement between the publisher and republisher before transmitting the content. For example, a publisher and republisher may utilize system 100 of FIG. 1 to enter into an agreement where the republisher pays a dollar amount and in return is licensed to republish a determined number of impressions (e.g., a republisher may spend $4 to be authorized to republish an article 1,000 times or another cost per mille ("CPM") scheme may be implemented). Thus, every time an end user loads the republisher's webpage and views the content, a count of remaining impressions may be reduced. Once a republisher runs out of impressions, the syndication engine may no longer deliver the content in response to a user loading the republisher's webpage. Details of monitization models are discussed in greater detail below.

As described above, a syndication engine may distribute a content object to one or more republishers. A syndication engine, additionally, may include a content object preparation module configured to create the content object from content on a page hosted by a publisher. For example, a publisher may indicate that they wish to make an article on a webpage available for republishing. However, the webpage hosted by the publisher often includes various information that the publisher may not wish to include in the republication. For example, a webpage showing a news article may include an image licensed from REUTERS™ that the publisher is not licensed to distribute, one or more ads that the publisher may not wish to distribute, and the like. A content object creation module may be executed to capture the data from the webpage and remove all portions that a publisher may not want to redistribute while maintaining desirable portions. For example, it may analyze the Cascading Style Sheet ("CSS") for the webpage to determine whether each element on the webpage should or should not be syndicated according to a set of rules and flag all elements that should not be included in the content object.

An exemplary algorithm for preparing a content object may first locate the document body and title, for example by using CSS selectors provided by the publisher or automatically using rules. Next, ads and any content the publisher has marked for exclusion may be located and removed from the content. Once ads and content marked for exclusion are removed, the document formatting may be normalized, for example by removing fonts, styles, alignment, and the like. Next, images, embedded video, and any other media content may be detected, their sizes determined, and tagged for a reformatting engine to later assemble the media into a republisher's webpage. After this, media content (e.g., images and embedded video) captions may be detected and associated with the media content. Finally, a new document may be assembled with standards compliant markup to form a content object.

Embodiments may allow a publisher to designate which elements the publisher chooses to include in a content object. For example, a web interface may allow a publisher to manually indicate whether they want to include elements of a certain type, such as images, videos, titles, and the like. Alternatively, the content object preparation module may first parse all elements on a webpage then may prompt the publisher to specifically select which elements the publisher chooses to include or not include in the content object.

Once the content object preparation module determines which content to include in the content object, the module may create a content object comprising a combination of Hypertext Markup Language ("HTML") and JAVASCRIPT. Pseudo code for an exemplary content object may take the form:

```
<html>
    <head>
        <!-- load reformatting script -->
        <!-- load reformatting style sheet -->
    </head>
    <body>
        <!-- simplified page content -->
        <!-- attribution block -->
        <!-- publisher supplied analytics code -->
    </body>
</html>
```

Of course, alternative embodiments may package content objects in various ways, for example using JAVASCRIPT Object Notation ("JSON") or Asynchronous JAVASCRIPT and XML ("AJAX") objects.

By removing various elements from the content, content may also be optimized for republication to a mobile device. For example, a publisher may utilize the content object preparation module to republish their own content to a mobile version of their website. This may provide the publisher with the convenience of only creating a single copy of the original content. Of course, the content object preparation module may also be useful to republish mobile versions of other publishers' content.

Figure 5:
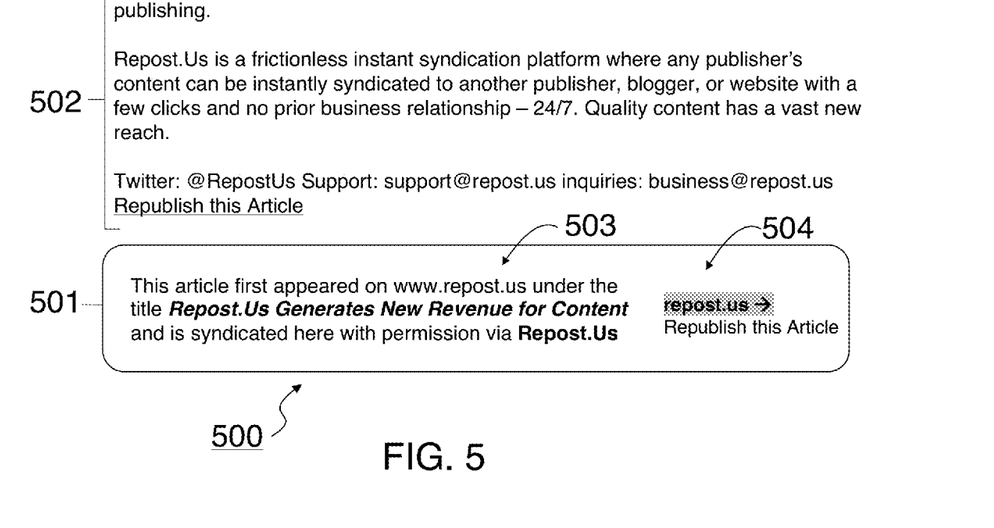
FIG. 5 shows an exemplary attribution block inserted at the end of content on a webpage.

An attribution module may also be executed by the syndication engine to insert attribution information into the content object. For example, FIG. 5 shows an exemplary attribution block 501 inserted at, or appended to, the end of content 502 on a webpage 500. The attribution block may provide a link 503 back to the original publisher's page to allow a user to access the original source. While exemplary attribution block 501 includes a text link 503, the link may take any form. For example, a screenshot of a portion the publisher's webpage, such as the links provided by CURATE.US™, may link to the original publisher's page. The attribution block may include additional information, for example a copyright notice or licensing information. For example, if the content is being distributed with a CREATIVE COMMONS™ license, the notice may indicate various parameters of the CREATIVE COMMONS™ license. The attribution block may also include a republish control 504, thereby allowing downstream republishers to republish directly from viewing content on a republisher's webpage rather than having to navigate back to the publisher's webpage.

The content object may be configured to allow content to be seamlessly integrated in a republisher's webpage. In addition to a republisher's CSS formatting the font, color, size, and the like of HTML elements, the content object may include one or more functions that may be executed to optimize the content for display in a placeholder in the webpage. For example, the embedded code may be within an iFrame in a webpage. The size of the iFrame displayed on a viewer's display device may be determined by the republisher's webpage design, the size of the viewer's browser window, the display device accessing the republished content (e.g., a desktop computer, a smartphone, a tablet, etc.), and the like.

When the content object is loaded into the iFrame, a reformatting function may be executed to analyze all objects on the page or in the iFrame (e.g., images, ads, etc.). The reformatting function may be, for example, a JAVASCRIPT function. The reformatting function may then apply a set of rules to dynamically reformat the content for display within the limitations of the placeholder or page. For example, a rule may be that if an object (e.g., an image) takes up less than two-thirds of a column's width and there is at least a three hundred pixel wide area remaining in the column, the object should be floated and the text of the content should wrap around the object and, if not, the object should be centered in the column and the text provided before and after the object. Additional rules may provide, for example, that if the image is to be centered and text provided before and after, the image should be scaled up to fill the entire width of the column, or if the column is more narrow than the image, the image may be scaled down to fit the width of the column. Of course, any such rules may be applied.

Additionally, the content object may be configured not only for dynamically formatting when first inserting content into an iFrame, but the content may dynamically reformat as the format of a webpage changes. For example, in response to a user resizing a window or a user moving objects on a dynamic webpage, a browser may again execute the reformat function.

There are various reasons why a user who navigates to a republisher's webpage may be blocked from viewing republished content. For example, because one or more functions may be executed by the user's browser to retrieve the republished content, a user having a browser that does not support various functions, or that has security options adjusted to prevent execution of various functions, may not be able to access the republished content. In such instances, rather than showing the republished content, the republisher's webpage may provide a link to the content on the publisher's website. The link may be, for example, a screenshot of a portion the publisher's webpage, such as the links provided by CURATE.US™.

Other times, a republisher may be blocked because they have exceeded their number of licensed impressions (i.e., content displays). When a republisher licenses a finite amount of impressions, after the number of impression runs out the republisher's page may provide a link to the content on the original publisher's website.

In still other instances, a publisher or a syndication engine may ban a republisher from republishing the publisher's content. For example, a republisher may be banned if they distribute their unique embed code to other content republishers. A publisher may also limit the geographic region where content may be republished. For example, a publisher may allow their content to be published in a first country, but want to avoid allowing the content to be published in a second country. In such instances the republisher's page may again provide a link to the content on the publisher's page. Of course, syndication engines may limit geographic regions other than countries, such as states, cities, city blocks, or any other geographic region.

A republisher may also be blocked if the republisher whose site the request comes from is not the republisher who the unique embed code was issued for. For example, at step 209 of FIG. 2, the browser on a reader 106 executes the embedded code in the republisher's webpage to request the content object from syndication engine 108. The request reader 106 transmits to syndication engine 108 may include an identifier of the content object requested, an identifier of the republisher whose website the embed code is embedded in (e.g., an identifier of the website a user navigated to), and an identifier of the republisher that the unique embed code was created for. Syndication engine 108 may be configured to check whether the identifier of the republisher's site in which the unique code is embedded matches the identifier of the republisher that the unique code was created for. If the identifiers match, syndication engine 108 may transmit the requested content object to reader 106. Alternatively, if the identifiers do not match, syndication engine 108 may return a link back to the publisher's content page rather than the content object.

When syndication engine 108 determines a unique embed code was created for a republisher other than the republisher whose page the unique embed code was embedded in, syndication engine 108 may take steps to ensure that in the future no unauthorized republishers use the authorized republisher's unique code. For example, a first time the syndication engine determines that the embed code resides in an unauthorized republisher's page, the syndication engine may alert the publisher, invalidate the authorized republisher's unique embed code, and generate a new unique embed code for the authorized republisher. However, after a certain number of unauthorized uses of the authorized republisher's unique embed code by one or more unauthorized republishers, the syndication engine may permanently ban the authorized republisher from republishing from that publisher or all publishers.

When a syndication engine limits the republication, such as for any of the above reasons, the system may be configured to not count displaying a link to the content on the publisher's webpage as an impression. This may insure that republishers are not unfairly charged when users view their webpage without having the republished content inserted.

A syndication engine may be configured to embed one or more ads in a content object. For example, a syndication engine may be configured to insert one or more static or dynamic ads into a placeholder, such as an iFrame, included in the HTML of the content object. A syndication engine may select directed ads based on the content of a content object. For example, a republished article about a baseball team may include embedded ads for tickets to watch baseball games. The ads may be static ads, for example images, FLASH™ ads, or videos embedded in the placeholder. Alternatively, embodiments may have creative code inserted in the placeholders configured to retrieve ads from one or more third party ad services. The creative code may be configured to update ads periodically, for example after a period of time, in response to a user action, and the like.

In some embodiments, a syndication engine may be configured to insert creatives, such as ads, provided by the original publisher. For example, a publisher may have their own creative delivery infrastructure and wish to have their creatives distributed with their syndicated content. In such embodiments, a syndication engine may be configured to insert one or more placeholders in the content object and to include code in the placeholders to retrieve creatives from the publisher. Such creatives may be hosted by the publisher or by a remote third party. For example, creative code in a placeholder within the content object may be executed by a user's browser to request a creative from a third party computing device. In response, the user's browser may receive a creative object, such as an ad packaged as a JSON object, and insert the creative object into the placeholder to display to the user.

Figure 6:
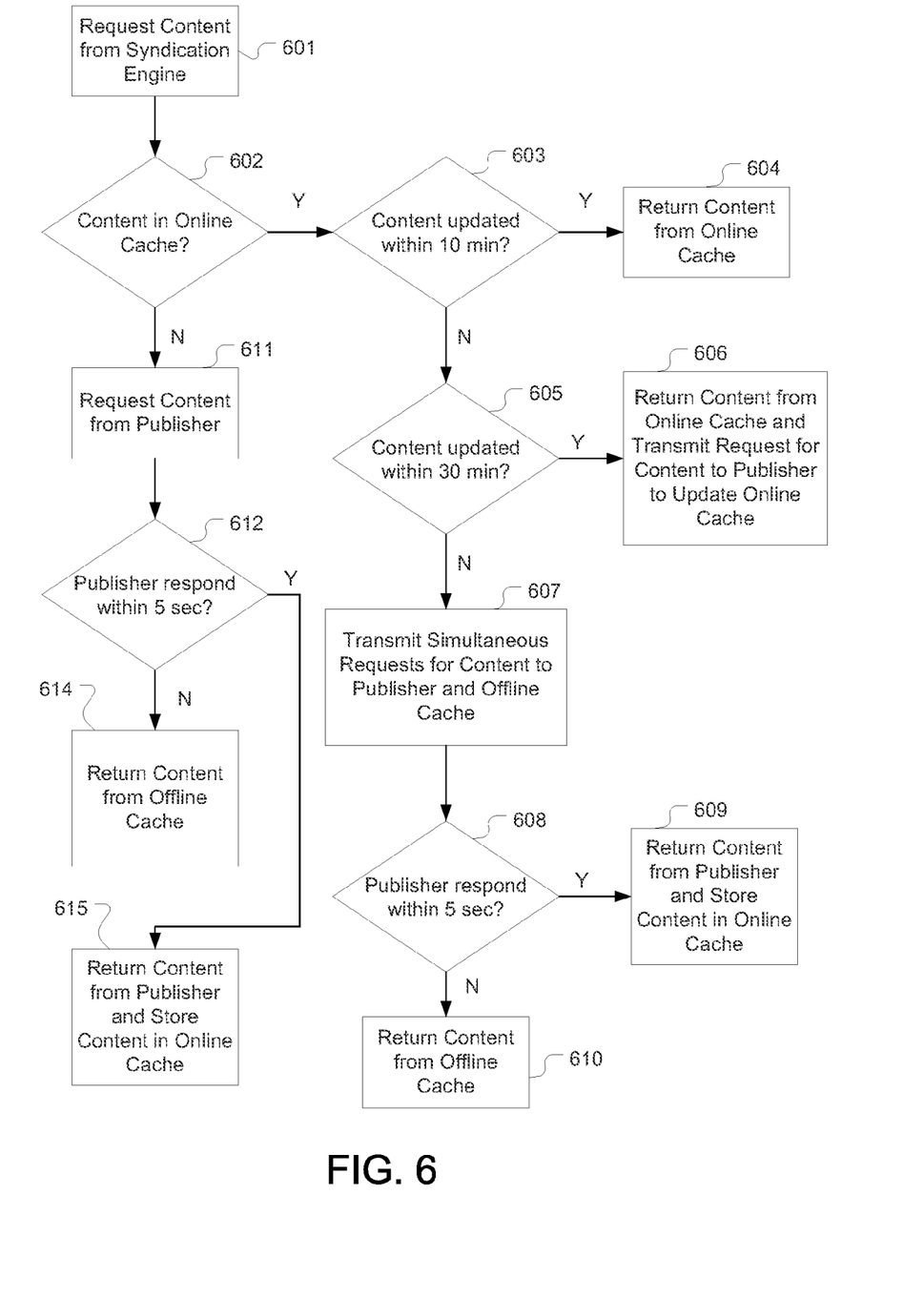
FIG. 6 shows an exemplary decision path for an intelligent caching system.

Embodiments may offer intelligent caching, thus achieving a balance of providing content to a user promptly and maintaining up-to-date data. FIG. 6 shows an exemplary decision path for an intelligent caching system. After a syndication engine receives a request for a content object at 601, at 602 the syndication engine may determine whether the content object is stored in online cache. Online cache may be, for example memcached by AMAZON WEB SERVICES™ ("AWS") or other cloud services. Of course, online cache may alternatively be cached on a web server. If at step 602 it is determined that the content object is stored in online cache, at step 603 the syndication engine may determine if the content object has been updated within a first time period, for example within the last ten minutes. If at step 603 it is determined that the content object has been updated within the first time period, at step 604 the syndication engine may transmit the content object directly from the online cache to the reader for insertion into the republisher's webpage. Alternatively, if at step 603 it is determined that the content object has not been updated within the first time period, at step 605 the syndication engine may determine whether the content object has been updated within a second time period, for example thirty minutes. If the content object has been updated within the second time period, at step 606 the syndication engine may transmit the content object directly from the online cache to the reader for insertion into the republisher's webpage. At step 606, the syndication engine may also transmit a request to the publisher for updated content and, after receiving the updated content, store and updated content object in the online cache.

Alternatively, if at step 605 it is determined that the content object has not been updated within the second time period, at step 607 the syndication engine may transmit simultaneous requests for content to the publisher and to offline cache. Offline cache may be, for example, a file server or other data store, such as an AWS storage service, maintained by the content engine for storing content objects. Offline cache may, thus, ensure that content objects are available should a publisher become unavailable. At step 608, the syndication engine may determine whether the publisher responds to the request within a third time period, for example five seconds. If at step 608 it is determined that the publisher responded within the third time period, at step 609 the syndication engine may transmit content from the publisher to the reader for insertion in the webpage and store a copy of the content object in the online cache. Alternatively, if at step 608 it is determined that the publisher did not respond with in the third time period, at step 610 the syndication engine may transmit a copy of the content object from the offline cache to the reader for insertion in the webpage.

Referring back to step 602, if it is determined that the content object is not in online cache, at step 611 the syndication engine may request content from the publisher. At step 612, the syndication engine may determine whether the publisher responded within a fourth time period, for example within five seconds. If at step 612 it is determined that the publisher responded within the fourth time period, at step 615 the syndication engine may return the content object from the publisher to the reader for insertion in the webpage and store the content object in the online cache. Alternatively, if at step 612 it is determined that the publisher did not respond with in the fourth time period, at step 614 the syndication engine may return the content object from the offline cache.

In each step where the content object is returned from the publisher, the content object may first be created by the syndication engine (e.g., various elements, such as copyrighted images, may be removed, creatives may be inserted, an attribution block may be inserted, and the like). Additionally, at various steps the offline cache may be updated as well. For example, at steps 606, 609, and 615 the offline cache may be updated with a new content object. Alternatively, the offline cache may be updated periodically, such as hourly or daily, to ensure that a fairly recent version of the content object is accessible.

Intelligent caching may provide for faster delivery of content than conventional methods of republishing content by pulling content directly form a publisher's site. Online caching may return a content object within much faster than a publisher's site would be able to.

Additionally, intelligent caching may greatly reduce the traffic on a publisher's servers, thereby reducing a publisher's bandwidth cost and resource usage. This may be especially helpful for a publisher with limited resources whose publication quickly becomes very popular and is reposted all over the web. For example, if a blogger has a popular post that is republished on the front page of heavily trafficked websites and the republishing pages each pull the article directly from the blogger's page each time their page is viewed, the blogger's server may fall over (i.e., become unresponsive) due to its inability to manage the traffic. Intelligent caching disclosed herein relieves the publisher of this potential problem. Indeed, this relief may be of great value because with the fast pace of the web, a heavily trafficked article may provide substantial revenue to a publisher (e.g., ad revenue) if users can access the article. However, if the publisher's site goes down, instead of reaching the tipping point of "going viral", users may generally lose interest and the publisher may never recognize the potential revenue the article could have generated. Content syndication disclosed herein may provide the publisher with a reliable revenue stream in such instances while reducing or eliminating the potential for the publisher's own site to be over-trafficked.

Additionally, should the publisher's site get flooded, or otherwise become unavailable, the intelligent caching system may provide an offline copy of the content object, thus ensuring both the availability of the content and maintaining the potential revenue stream for the publisher. For example, a copy of content may be placed in offline cache when a publisher first request syndication, such as shown in FIG. 3 above. Thus, even if the publisher has a technical malfunction and loses their own copy of the content, the integrity of the content may be ensured, as well as the potential profits for the publisher.

Moreover, intelligent caching provides both faster delivery of content and improved reliability of content while ensuring the content also stays current. For example, if a publisher corrects an inaccuracy in their content on their webpage, the content may be updated in the online cache within the first time period, for example within ten minutes.

The times shown in FIG. 6 are exemplary only and alternative times may be used. Additionally, the times for an intelligent caching system may be dynamically adjusted in response to use of the system. For example, caching timing may be adjusted based on received web analytics data. Intelligent caching systems may also include timing according to a publisher's specifications.

Figure 7:
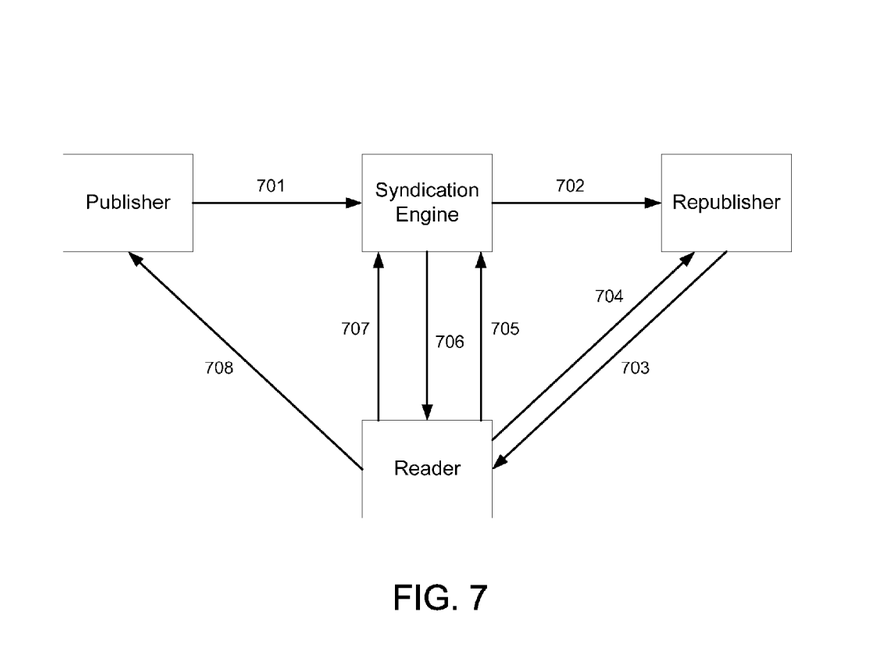
FIG. 7 shows a functional illustration of an exemplary data flow of analytics code and responses through the system of FIG. 1.

A syndication engine may be configured to implement various web analytics systems to collect and analyze republication data. Analytics systems may be useful for both understanding republication and optimizing republication systems. FIG. 7 shows a functional illustration of an exemplary data flow of analytics code and responses through system 100 of FIG. 1. At step 701 a syndication engine may receive original content from a publisher which may include the publisher's analytics code. The syndication engine may be configured to include the publisher's analytics code in the content object the syndication engine creates. At step 702, the syndication engine may transmit a unique embed code to a republisher. Note that several steps shown in FIG. 2 are omitted from FIG. 7 to clarify the data flow of the exemplary analytics system. The embed code may not include any analytics code, rather the analytics code may later be distributed with the content object. Because the content object is inserted into the republisher's webpage in the reader's browser, this may ensure that a republisher cannot remove or alter analytics code provided by either the publisher or the syndication engine. Of course, in other embodiments analytics code may also be transmitted with the embed code at step 702.

At step 703, the republisher transmits their webpage to a reader. The webpage transmitted at step 703 includes the embed code and may include analytics code from the republisher. If analytics code from the republisher is included in step 703, the reader's browser may execute the analytics code when it loads the webpage and at step 704 the reader's browser may transmit analytic information to the republisher.

At step 705, the reader's browser may execute the embed code and request the content object from the syndication engine. At step 706, the syndication engine may transmit the content object to the reader. The content object may include any analytics code from the publisher as well as analytics code from the syndication engine. When the reader's browser loads the content object into the page, it may execute both the syndication engine's analytics code as well as the publisher's analytics code. At step 707, the reader's browser may transmit analytics information to the syndication engine and at step 708 the reader's browser may transmit analytics information to the publisher.

Conventional methods of republishing content from webpages allow republishers to potentially alter or remove analytics code a publisher may include with their content. In contrast, syndication systems disclosed herein increase integrity of web analytics. Additionally, the web analytics data received by a syndication engine may be useful for optimizing timing of intelligent caching, determining pricing for republication, determining creatives (e.g., ads) to insert into content objects, and the like.

Syndication systems disclosed herein may provide various monetization models for syndicating content. As shown in FIG. 3, models may include a free syndication model, a syndication engine supplied ads model, and a bring your own ads model. Of course, these models are only exemplary and many other models may be offered as well.

In the tradition of the open-source internet, a syndication engine may support free content models. Free content models may be, for example based on the CREATIVE COMMONS™ license structure.

In the syndication engine supplied ads model, content from publishers may be packaged in content objects by a syndication engine with embedded advertising from a major ad network, such as from GOOGLE™. As content objects are loaded in reader's browsers, the ads are inserted for display to the user. The ads may thus provide revenue with portions going to both the publisher and the syndication engine owner.

In the bring your own ads model, larger publishers may leverage their existing sales infrastructure and creative systems. Thus, the content object may become an extension of the publisher's site, generating ad impressions and revenue from the offsite page views.

Content may also be offered according to a CPM model with publisher-defined pricing bands. This may be an attractive model for anyone from a small blog, who may take advantage of the distribution infrastructure to reach more viewers and to create a revenue stream, to a major publication, who may take advantage of offloading traffic and creating corollary revenue streams for republications of their content in addition to their primary posting. For example, a publisher may specify price bands for one thousand, five thousand, twenty-five thousand, one hundred thousand, and unlimited views of republished content.

Alternatively, content may be offered according to a donation model. For example, content originally offered on non-profit websites may be offered for syndication and viewers of the republished content may offer donations to the publisher. A modest percentage of the donation amount may go to the syndication engine owner for servicing the model.

Of course, these models are exemplary only and other models may be implemented. Additionally, these models may be employed in combination, for example with one model reverting to another at a publisher-defined threshold. Additionally, models may be offered for individual pieces of content, content collections, entire sites, and other groupings of content.

Syndication engines may be configured to implement various systems to ensure privacy of readers of republished content. Syndication engines may, for example, not track any received transmissions that include do not track headers. Additionally, syndication engines may be configured to remove tracking code from original content when creating a content object if the tracking code could potentially infringe on a user's privacy. Alternatively, a syndication engine may be configured to not alter any tracking code in original content but to require the publisher of the original content to provide a disclaimer regarding privacy settings.

Syndication engines disclosed herein may improve on conventional syndication and content distribution systems by virtue of the fact that a syndication engine may not be a licensee of any publishers. Rather, a syndication engine may simply facilitate the licensing of content directly from publishers to republishers.

As described with relation to the intelligent caching system, embodiments may allow for distribution of substantially up-to-date content. The syndication engine may additionally be configured to check whether content has changed, for example by comparing a content object stored in online cache with a content object stored in offline cache. The syndication engine may be configured to indicate changes in content, for example by highlighting changes. Alternatively, a changed content object may simply include an indication that the object has changed since first publication. A syndication engine may allow a publisher to indicate whether such features should be activated. Additionally, the offline cache may be configured to periodically store archival copies of content objects.

A content object may additionally include code configured to be executed by a browser to periodically check if there have been updates to the content. For example, republished content may be the content of a blog that receives frequent updates. In such instances, the content object may be configured to refresh according to a triggering event. For example, the triggering event may be time based, such as every five minutes, or may be in response to a user selecting a refresh content control.

Syndication systems disclosed herein may deliver republished content to users while remaining completely transparent to the user. These systems may also increase integrity of republished content by ensuring it is delivered either from the publisher or from the syndication engine's cache, which in turn came from the publisher. Because the content is inserted into a republisher's webpage in a user's browser rather than on a republisher's server, the republisher cannot alter the content.

Additionally, such syndication systems allow a user to see the entirety of the republished content. This may greatly improve the initial publisher's revenue stream as users may only click a text link to a publisher's content about one percent of the time and click an image link to a publisher's content about five percent of the time. Additionally, but presenting content directly to a user, the user is more likely to take interest in the content and pass it on to others, thus increasing the likelihood that content reaches the tipping point of going viral.

Further, traditional methods of reposting by copying content from an original publisher's webpage and inserting it directly into a republisher's webpage, even if done according to a negotiated republication agreement, assisted the republisher with search engine optimization ("SEO") while providing no boon to the original publisher of the content. In contrast, because syndication systems disclosed herein provide that only the embed code may be inserted into the republisher's webpage, search engine web crawlers would not recognize republishers' webpages as having the same content as the original publisher's webpage. Thus, syndication systems disclosed herein may prevent or substantially reduce the dilution effect republishers traditionally have on a publisher's SEO and, in turn, increase the original publisher's search engine ranking. Further, search engines may observe that a republisher's webpage links back to the publisher's webpage for the content, thus improving the publisher's SEO.

These syndication systems, while useful for small publishers and large publishers alike, may be particularly useful to small publishers who may not have the resources or knowledge to convert public interest in the content they create into revenue streams. These syndication systems may offload the business end of content distribution from a publisher while providing the publisher with a revenue stream created by their content.

Embodiments may additionally include user interface controls for copying content with attribution information. FIG. 4 shows an exemplary clip control 403 configured to copy content to the clipboard and append to the end of content attribution information. For example, when a user selects clip control 403, the text of content 401 may be copied to the clipboard and the author, publisher's website's universal resource locator ("URL"), and additional attribution information may be appended to the end of the content.

Embodiments may also be configured to assist a user with attribution of portions of the content a user copies. For example, a webpage may be configured to provide a copy user interface control to a user who highlights a portion of text and right-clicks on the highlighted portion. For example, the copy user interface control may be a drop-down menu, a pop-up, a pop-in, a dialog box, or any other conventional user interface control that may ask a user if they would like to append attribution information to the copied text. Embodiments may be configured to only provide a user with the copy user interface control when a user selects at least a threshold number of characters or words. For example, the copy user interface control may be displayed to a user who selects at least twelve words then right clicks. Of course, alternative embodiments may be configured to automatically append attribution information to copied text if at least a threshold length of text is copied.

A syndication system may provide a republish control, such as republish control 402 shown in FIG. 4, for every page of a website so that all content posted on the website may be conveniently republished. However, embodiments may be configured to disable the republish control if the content displayed on a page is republished content. In such instances, the republished content may include a republish control in the attribute block to allow downstream users to continue to republish the content.

Alternatively, rather than disabling a republish control on a webpage displaying republished content, the republish control on such a page may be configured to republish only original content on the webpage and not the republished content on the webpage. For example, a webpage may include both republished content and original content, such as original content commenting on the republished content. Such a webpage may include a republish control configured to only allow the user to republish the content original to the page. A user interface object, such a dialog box, may prompt a user after selection of the republish control to inform the user of the extent of content available for republication. Of course, an attribution block appended to the end of the republished content on the webpage may allow a user to republish the republished content as well.

In still other embodiments, a webpage having both republished content and original content may have a republish control configured to allow republication of both the original content and the republished content. Such republication may include an attribution block for each section of content. Such embodiments may utilize a modified monetization model configured to provide revenue to both publishers. Of course, such syndication systems may be expanded to include content from more publishers and republishers as well.

Exemplary embodiments shown in the figures generally show syndication systems republishing text content. Of course, embodiments are not limited to republication of text content and may be utilized to republish any type of content. For example, webpages including images, streaming media (e.g., streaming video and/or streaming audio), or any other content may be republished in the same fashion.

Embodiments may also provide an offline republication control. An offline republication control may allow for a republisher to request an offline copy of content, such as a printer friendly copy of the content, a Portable Document Format ("PDF") copy for download, or copies in other formats. Such embodiments may provide a custom link to download the content, the link being configured to track how many times the content is downloaded. Alternatively, a republisher may be required to pay up front for a determined number of copies and enter into an agreement to republish only the determined number of copies.

Of course, once a user acquires an offline copy of the content, a syndication system may be very limited in enforcing limits on republication. To attempt to police republication, such systems may include digital rights management ("DRM") solutions.

Offline republication systems may be useful for republishing content for ereaders, such as the AMAZON™ KINDLE™ and BARNES AND NOBLE™ NOOK™. For example, PDF copies of republished content may be read by ereaders. Of course, as ereaders advance embodiments may be configured to republish content in various formats that may be directly accessed by ereaders.

Syndication systems may additionally include a syndication marketplace configured to provide a collection of content available for republication. For example, ever time a publisher makes content available for republication, in addition to placing a republish control on the webpage displaying the content, the content may also be offered for republication on a central syndication marketplace. The syndication market place may be a webpage hosted by the syndication engine. It may provide an interface to allow a user to browse syndicated content to find content for republication. For example, content may be cataloged to allow a user to search by topic, popularity, media type (e.g., text, streaming video, images, etc.), date, and the like. A user may select content for republication directly from the syndication marketplace and receive a unique embed code to embed the content in a webpage in similar fashion to other embodiments described herein. Thus, a publisher whose website does not regularly receive much traffic may increase the likelihood of republication, and their potential revenue, by placing their content in a syndication marketplace.

Syndication systems may not be limited to distributing content. Alternative syndication systems may republish portions of e-commerce webpages. E-commerce webpage, such as AMAZON.COM™, generally offer catalogs of products that a user may purchase. Syndication systems may be configured to provide a republish user interface control on an e-commerce webpage to allow a republisher to allow a user to purchase products from the e-commerce retailer directly from the republisher's webpage. A unique embed code may be provided to the republisher to embed in their webpage. The unique embed code may request an e-commerce object from the syndication engine for insertion into the republisher's webpage in similar fashion to the content objects described above. The e-commerce object may include additional functionality to allow a user to purchase products and services directly from the e-commerce retailer.

Syndicated e-commerce systems may ensure accuracy of price, availability, and the like of the listing of products on a republisher's webpage. Syndicated e-commerce systems may additionally improve the business cycle because users are less likely to click links to get to the original retailer, links to the retailer can die over time if the retailer changes their webpage, and the like. Additionally, syndicated e-commerce systems may provide full functionality of e-commerce site, such as auto-populating a user's information, because the e-commerce object may be requested directly from the user's browser, not inserted in the republisher's page at the server.

Syndicated e-commerce systems may be configured to apply different or no caching rules. Additionally, syndicated e-commerce systems may reformat e-commerce content differently than other syndicated content, or may not reformat e-commerce content at all. Syndicated e-commerce systems may be configured to load content directly from an e-commerce retailer's website or otherwise through a system hosted by the e-commerce retailer, rather than from a syndication engine. In this case, the embed code may consult the syndication engine for info regarding what content to serve and may retrieve it directly from the e-commerce website.

E-commerce objects may provide additional structure to the data to allow republishers to uniformly arrange republished e-commerce products on a webpage. For example, e-commerce objects may include XML specifying various attributes of e-commerce products within an e-commerce object.

Figure 8:
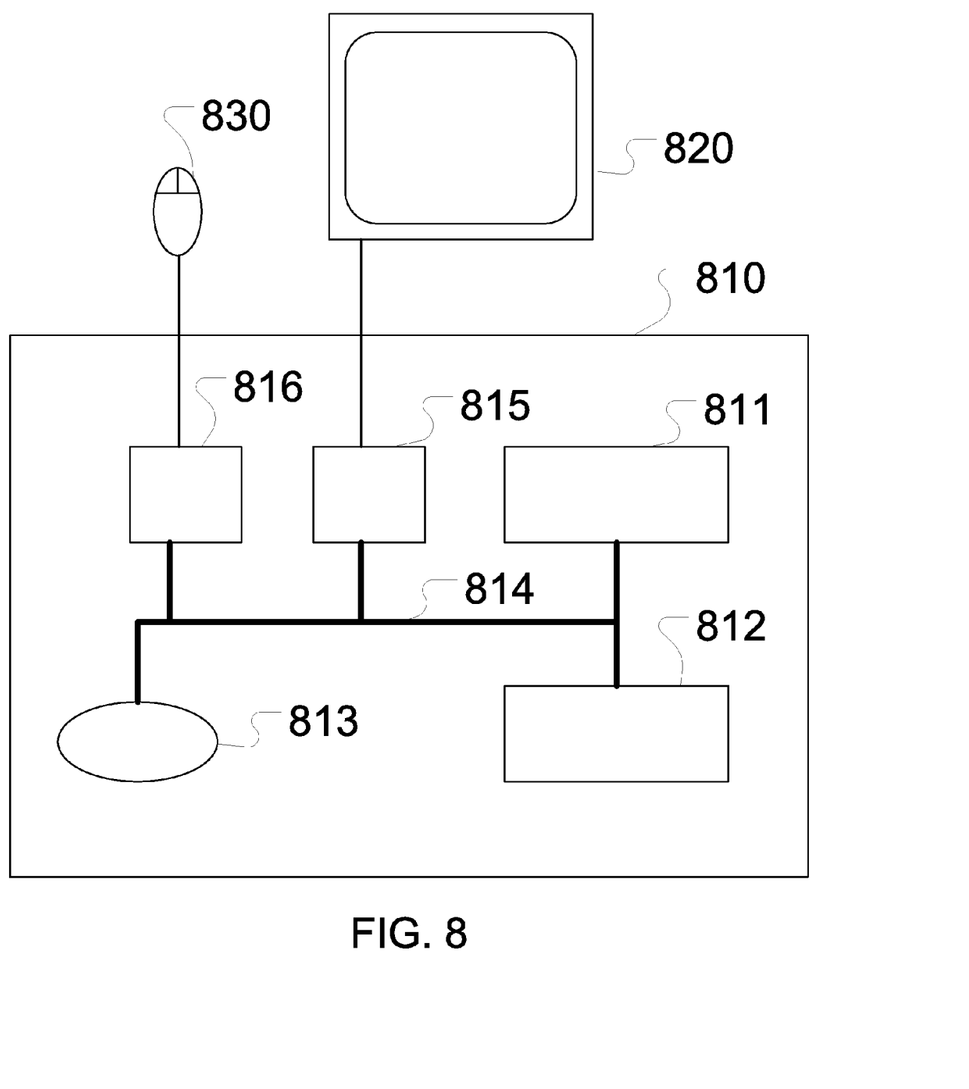
FIG. 8 shows an exemplary computing device useful for performing processes disclosed herein.

These embodiments may be implemented with software, for example modules executed on computing devices such as computing device 810 of FIG. 8. Embodiments may, for example, execute modules corresponding to steps shown in the methods disclosed herein. Of course, a single step may be performed by more than one module, a single module may perform more than one step, or any other logical division of method steps may be used to implement the processes as software executed on a computing device.

Computing device 810 has one or more processing device 811 designed to process instructions, for example computer readable instructions (i.e., code) stored on a storage device 813. By processing instructions, processing device 811 may perform the steps disclosed herein. Storage device 813 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 810 additionally has memory 812, an input controller 816, and an output controller 815. A bus 814 operatively couples components of computing device 810, including processor 811, memory 812, storage device 813, input controller 816, output controller 815, and any other devices (e.g., network controllers, sound controllers, etc.). Output controller 815 may be operatively coupled (e.g., via a wired or wireless connection) to a display device 820 (e.g., a monitor, television, mobile device screen, touch-display, etc.) in such a fashion that output controller 815 can transform the display on display device 820 (e.g., in response to modules executed). Input controller 816 may be operatively coupled (e.g., via a wired or wireless connection) to input device 830 (e.g., mouse, keyboard, touch-pad, scroll-ball, touch-display, etc.) in such a fashion that input can be received from a user.

Of course, FIG. 8 illustrates computing device 810, display device 820, and input device 830 as separate devices for ease of identification only. Computing device 810, display device 820, and input device 830 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 810 may be one or more servers, for example a farm of networked servers, a clustered server environment, or a cloud network of computing devices.

Embodiments have been disclosed herein. However, various modifications can be made without departing from the scope of the embodiments as defined by the appended claims and legal equivalents.

What is claimed:

1. A method of republishing and syndicating digital content, comprising:
    registering a publisher with a syndication engine;
    in response to receiving, from the publisher; an indication of content available for syndication at the syndication engine; the content comprising original media originating with the publisher and a digital advertisement in-line with the original media, linking the original media and the digital advertisement to a unique embed code;
    in response to registering the publisher with the syndication engine, transmitting a republish control for the publisher to embed in the content;
    upon receipt of a request to view the content from a republisher; triggering the publisher to transmit the content and the republish control to the republisher;
    prompting transmission of a request to republish the content to the syndication engine in response to selection of the republish control by the republisher;
    at the syndication engine, transmitting the unique embed code to the republisher for embedding into a republisher webpage in-line with secondary content within the republisher webpage;
    at a first time, triggering insertion of the original media and the digital advertisement in-line with the original media into an instance of a publisher webpage associated with the publisher;
    at a second time, triggering insertion of the original media and the digital advertisement in-line with the original media into an instance of the republisher webpage loaded into a client web browser based on presence of the unique embed code in the republisher webpage;
    serving analytics code for the digital advertisement to the computing device;
    returning an impression of the digital advertisement recorded by the analytics code to the publisher for summation with impressions of the digital advertisement recorded at the publisher webpage;
    retrieving a monetization model defining distribution of advertising revenue for impressions of the digital advertisement, viewed within the content inserted into the republisher webpage, between the publisher and the republisher; and
    applying the monetization model to impressions of the digital advertisement viewed within the content inserted into the republisher webpage.

2. The method of claim 1, wherein triggering the publisher to transmit the content and the republish control to the republisher comprises triggering the publisher to transmit the content and the republish control to the republisher in response to receipt of the republish request specifying the identity of the republisher and the content on the republisher webpage.

3. The method of claim 1, further comprising receiving, from the republisher, selection of a licensing option for the content prior to transmitting the unique embed code to the republisher.

4. The method of claim 1, wherein triggering insertion of the original media and the digital advertisement in-line with the original media into the instance of the republisher webpage loaded into the client web browser comprises:
    triggering the syndication engine to transmit the content to the client web browser for insertion into the instance of the republisher webpage in response to receipt of the unique embed code from the client web browser.

5. The method of claim 4, further comprising prompting client web browser to reformat the original media and the digital advertisement according to a format of the instance of the republisher webpage within the client web browser.

6. The method of claim 1, wherein transmitting the unique embed code to the republisher comprises, in response to receiving a republication request, generating the embed code that uniquely identifies the republisher and the content for republishing; and wherein transmitting the unique embed code to the republisher for embedding into the republisher webpage comprises approving republication of the content on the republisher webpage based on an identity of the republisher identified in the unique embed code.

7. The method of claim 6, wherein approving republication of the content on the republisher webpage comprises removing portions of data from the content based on a permission defined by the publisher.

8. The method of claim 6, wherein approving republication of the content on the republisher webpage comprises approving republication of the content on the republisher webpage in response to a threshold number of approved republication instances for the content exceeding a current count of republication instances of the content.

9. A method comprising:
    at a syndication engine, receiving, from a republisher, a selection of original content for republication on a republisher webpage hosted by the republisher, the original content published on a publisher webpage hosted by a publisher;
    confirming availability of a first digital advertisement for republication with the original content on the republisher webpage based on permissions associated with publisher webpage, the first digital advertisement contained within the publisher webpage in-line with the original content;
    generating an embed code linking the original content to the republisher webpage;
    in response to availability of the first digital advertisement for republication with the original content on the republisher webpage, associating the first digital advertisement with the embed code to preserve placement of the first digital advertisement in-line with the original content outside of the publisher webpage;
    at a first time, triggering insertion of the original content and the first digital advertisement in-line with the original content into an instance of a publisher webpage associated with the publisher;
    at a second time, in response to receipt of the embed code from a computing device executing a client web browser requesting access to the republisher webpage;

triggering return of the original content to the computing device for display adjacent secondary content within the republisher webpage rendered in the client web browser, the secondary content affiliated with the republisher;

removing a second digital advertisement marked for exclusion by the publisher from the original content; and triggering return of media remaining in the first digital advertisement to the computing device for display with the original content within the republisher webpage rendered in the client web browser.

10. The method of claim 9, further comprising reformatting the media remaining in the original content and the first digital advertisement into a single iframe for republication at the republisher webpage viewed on the computing device.

11. The method of claim 9, wherein triggering return of the original content and the first digital advertisement to the computing device comprises inserting an attribution block in-line with the original content and the first digital advertisement and triggering return of the original content, the first digital advertisement, and the attribution block to the computing device, the attribution block comprising a link to the publisher webpage.

12. The method of claim 9, further comprising returning a link to the original content on the publisher webpage in response to blockage of the original content by a second computing device executing a second client web browser requesting access to the republisher webpage.

13. The method of claim 9, wherein triggering return of the original content and the first digital advertisement to the computing device comprises serving analytics code for the first digital advertisement with the first digital advertisement to the computing device; and further comprising returning an impression of the first digital advertisement recorded by the analytics code to the publisher for summation with impressions of the first digital advertisement recorded at the publisher webpage.

14. The method of claim 9, wherein triggering return of the original content and the first digital advertisement to the computing device comprise republishing the original content and the first digital advertisement in-line with the original content adjacent the secondary content within the republisher webpage, the secondary content comprising a second advertisement affiliated with the republisher webpage.

15. The method of claim 9, wherein triggering return of the original content to the computing device comprises serving the original content containing a visual placeholder for the first digital advertisement to the computing device for rendering within the republisher webpage; and wherein triggering return of the first digital advertisement to the computing device comprises serving the first digital advertisement to the computing device for insertion into the visual placeholder.

* * * * *